United States Patent [19]

Opdyke

[11] Patent Number: 5,331,131
[45] Date of Patent: Jul. 19, 1994

[54] SCANNING TECHNIQUE FOR LASER ABLATION

[75] Inventor: Kenneth L. Opdyke, Fairport, N.Y.

[73] Assignee: Bausch & Lomb Incorporated, Rochester, N.Y.

[21] Appl. No.: 953,399

[22] Filed: Sep. 29, 1992

[51] Int. Cl.⁵ .............................................. B23K 26/00
[52] U.S. Cl. ............................ 219/121.69; 219/121.8
[58] Field of Search ............ 219/121.8, 121.68, 121.69

[56] References Cited

U.S. PATENT DOCUMENTS

| | | | |
|---|---|---|---|
| 4,417,948 | 11/1983 | Mayne-Banton | 156/643 |
| 4,563,565 | 1/1986 | Kampfer et al. | 219/121.69 |
| 4,568,632 | 2/1986 | Blum | 430/322 |
| 4,785,161 | 11/1988 | Strom | 219/121 |
| 4,912,298 | 3/1990 | Daniels et al. | 219/121.69 |
| 5,053,171 | 10/1991 | Portney et al. | 219/121.69 |
| 5,061,342 | 10/1991 | Jones | 156/643 |
| 5,091,626 | 2/1992 | Lewis et al. | 219/121.69 |
| 5,130,512 | 7/1992 | Coyle, Jr. et al. | 219/121.69 |
| 5,141,506 | 8/1992 | York | 219/121.69 |

FOREIGN PATENT DOCUMENTS

| | | | |
|---|---|---|---|
| 0398082 | 11/1990 | European Pat. Off. | |
| 0161182 | 7/1991 | Japan | 219/121.69 |
| 8908529 | 11/1988 | PCT Int'l Appl. | |

OTHER PUBLICATIONS

Application Ser. No. 07/954858, Sep. 27, 1992, Chan.
Application Ser. No. 07/953408, Sep. 29, 1992, Chan.
Application Ser. No. 07/953607, Sep. 29, 1992, Opdyke.
Application Ser. No. 08/080885, Jun. 22, 1993, Opdyke.

Primary Examiner—Richard A. Bertsch
Assistant Examiner—Alfred Basichas
Attorney, Agent, or Firm—David M. Krasnow; Craig E. Larson

[57] ABSTRACT

Improved methods for modifying target surfaces through ablation which result in a reduction of ablation debris redeposition on the target surface are disclosed.

16 Claims, 2 Drawing Sheets

SCANNING TECHNIQUE FOR LASER ABLATION

BACKGROUND OF THE INVENTION

1. Field of the Invention

The present invention relates to the field of laser modification of target surfaces through ablation and methods for smoothing surfaces using lasers as well as targets modified by such ablative techniques.

2. Background of the Invention

The use of laser beams to modify surfaces is known. In the early 1980's, it was discovered that pulsed lasers emitting in the ultraviolet frequency range could affect a target surface through ablative photodecomposition (APD). Later it was found that by using APD, layers of target material could be removed on the order of about one micron of target material per pulse.

It was further noted that APD did not significantly alter the characteristics of the newly exposed material immediately below the ablated material. This phenomenon has been explained as being due to the UV laser providing enough energy in a short enough period of time to actually break the covalent bonds of the polymeric target materials without heating the substrate. (See U.S. Pat. Nos. 4,417,948 and 4,568,632). Further scanning techniques using APD are disclosed in U.S. Pat. No. 5,061,342.

Upon further investigation, it was found that certain materials, when ablated, created varying amounts of ablation debris, some of which was redeposited upon the surface of the target material. It was believed that this redeposited debris could frustrate efforts to predictably alter the ablated target surface.

Further, it was found that certain materials could not be as cleanly etched as others. A method for ablating a target surface while also removing the deposited and adhered debris from the target surface while avoiding further debris accumulation was not known.

SUMMARY OF THE INVENTION

A novel method for ablating surfaces in a way that simultaneously clears away deposited debris and avoids subsequent debris accumulation has now been determined. To obtain a desired resulting surface on a selected target, the debris formed during the ablation process which becomes redeposited at, and adheres to the target surface must be removed from the target surface before the ablation process continues over the remainder of the target surface.

In accordance with the present invention a method is disclosed for ablatively modifying a target surface while avoiding ablative debris accumulation comprising the steps of a) directing a beam of pulsed UV radiation at the point of the target surface where the least amount of material is to be removed; and b) scanning the beam in the direction toward the portion of the target surface where the greatest amount of material is to be removed.

In a further embodiment, a method is disclosed for ablating a target surface comprising the steps of a) directing a beam of pulsed UV radiation at a first edge of the target surface; b) scanning said beam in a direction toward and stopping at a bisecting line on the target surface; c) rotating the target 180 degrees; d) returning the beam to its position in step a) at the edge of the target surface; and e) scanning the beam in a direction toward and stopping at said bisecting line such that the entire target surface is scanned.

It is further thought that the invention of the present application is especially useful for profiling, crosslinked, thermoset, thermoplastic or other materials including optically clear materials suitable for use as contact lenses.

DETAILED DESCRIPTION OF THE DRAWINGS

Figure 1A:
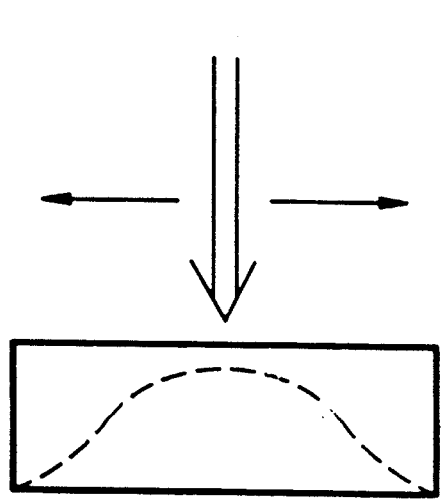
FIG. 1a depicts a cross-sectional view of a contact lens blank. The dotted line is an exaggeration of the desired final toric surface.
Figure 1B:
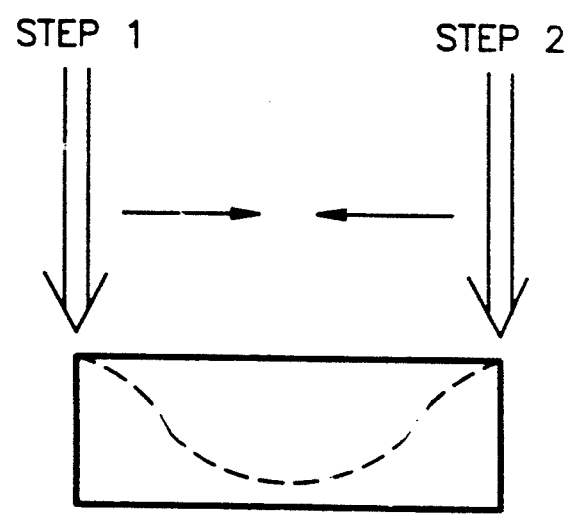
FIG. 1b depicts a cross-sectional view of a contact lens blank. The dotted line is an exaggeration of the desired finished curve for a lens surface.

As shown in FIGS. 1a and 1b, any type of desired final surface can be imparted on the target surface using the laser scanning of the present invention. As FIG. 1a shows, a toric curve can be placed on the target by removing more material at the periphery of the optical zone. Lenses with varying power can also be fashioned as shown in FIG. 1b wherein less material is removed at the periphery of the optical zone and more material is removed in the center of the optical zone. It is understood to the skilled practitioner in the field that surfaces of any configuration can be produced using the present invention and that the figures presented are for illustrative purposes only.

Figure 2:
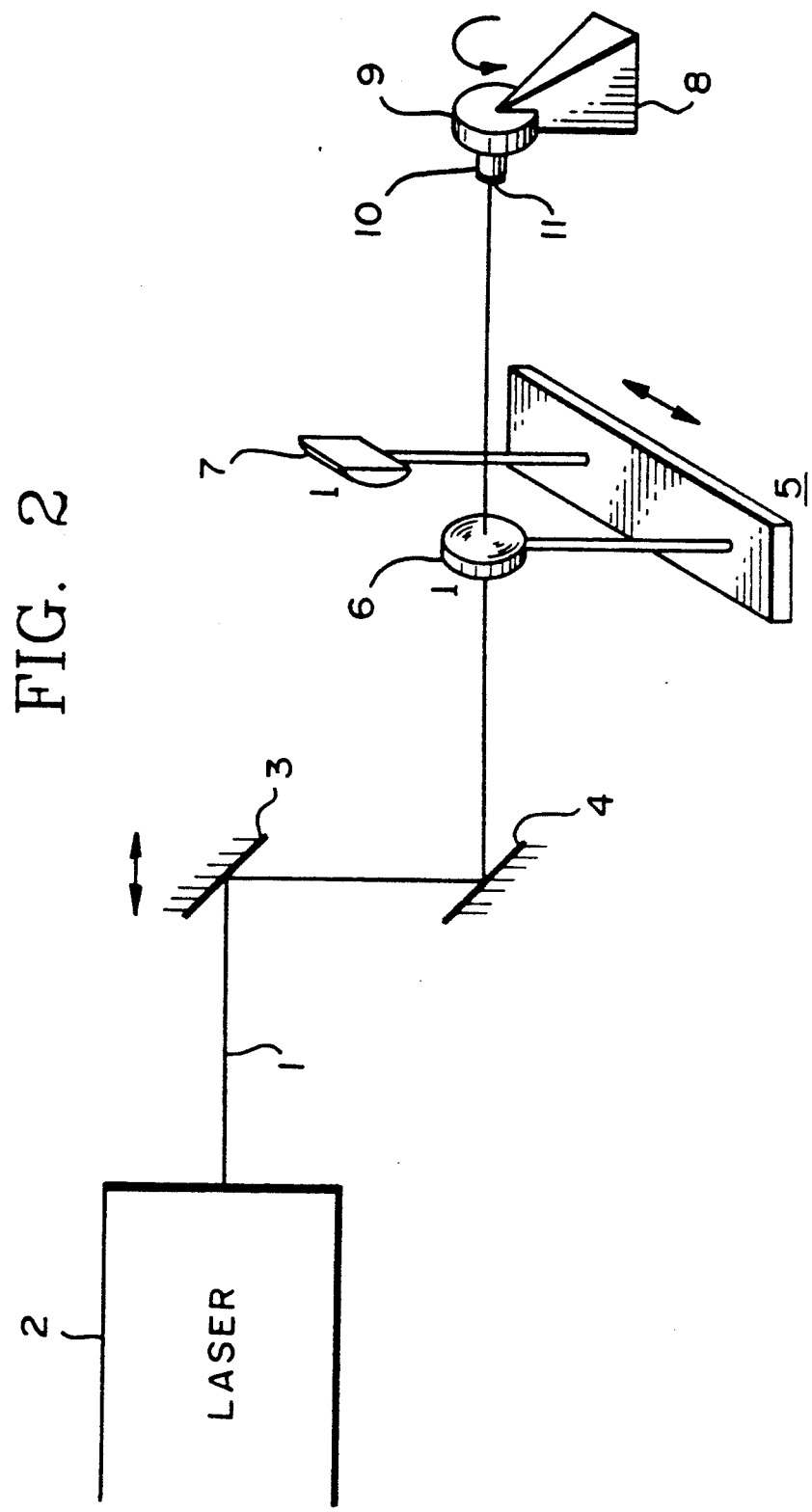
FIG. 2 is a diagram depicting a representative experimental set up for the novel scanning technique.

FIG. 2 depicts one possible set-up for employing the present invention. The raw laser beam (1) is emitted from an excimer laser (2). The raw beam is directed to a first scanning mirror (3) and may be directed to a second scanning mirror (4). The raw beam is then directed to a movable beam modification stage (5) which may comprise a focussing lens (6) which produces high fluence. The beam modification station may also comprise a cylindrical lens (7) for producing beams of low fluence. After the beam has been modified, it is directed to the target station (8). The target station comprises a rotatable means (9) to which is attached a mounting means (10) to hold the target (11) in place.

DETAILED DESCRIPTION OF THE INVENTION

The present invention relates to a new method of modifying optical surfaces to produce changes in their spherical, cylindrical or other refractive power, shape factor or other surface geometry. This new method is a modification of the procedures taught in U.S. Pat. No. 5,061,342, the entire content of which is incorporated by reference herein.

The method of the present invention employs UV radiation to ablate material from a target surface in order to produce a desired final surface on the target. Suitable target surfaces to be ablated include contact lenses, contact lens blanks, molds used to make contact lenses, tools used to make such molds, and any object which either directly or indirectly imparts a desired predictable final spherical, cylindrical or other refractive power on an object, such as a contact lens.

Varying amounts of material must often be removed from a target surface to produce a desired end result. For example, to produce toric surfaces on a contact lens, more material must be removed from the edges or periphery of the optical zone than from the central region of the optical zone. (See FIG. 1a). Therefore, to produce the toric surface, a significant amount of ablated debris is created at the periphery of the optical zone as compared to the debris created when the central region of the optical zone is scanned and its surface ablated.

It was discovered that when the laser beam begins its scan at one edge of a lens to produce toric surface, significant ablated debris was randomly redeposited on the surface of the lens. Some of the debris was redeposited on the lens target in the path of the laser beam scan. When this occurred, as the laser continued its scan, the first material encountered by the beam was not the original target surface, but was the redeposited and freshly adhered debris from the periphery.

Toric contact lenses are understood to be lenses which correct the insufficient visual acuity caused by astigmatism. Such lenses have a cylindric component of refraction, which refractivity is not constant in all planes passing through the optical axis, but has a maximum refractivity in one plane and a minimum refractivity in another plane perpendicular to the first plane.

While the final surfaces created from the so called edge-to-edge scans described in U.S. Pat. No. 5,061,342 were often an improvement over other known surface modification procedures, such as lathing, et al., it was believed that the debris which was sometimes created, hindered the best results possible. Therefore, in one embodiment of the present invention, the laser beam scan is initiated at or near the point at which the least amount of material is to be removed and directed toward the point at which the greatest amount of material is to be removed to create the final surface. In the case of the toric surface, the least amount of material is removed near the center of the optical zone. Therefore, as contemplated by the present invention, the beam is initially located at a bisecting line of the lens and scanned toward the one edge of the lens. When the beam reaches the edge, the scan is terminated and the beam returned to the bisecting line, or initial scan position. The stage to which the lens or other target is affixed is then preferably rotated 180 degrees such that the beam may travel in the same direction as it traveled to scan the first "half" of the target. At this point the beam once again is activated and the scan proceeds to move away from the bisecting line and toward the edge, this time scanning over the remainder of the target surface. In this way more of the debris seems to be effectively removed from the optical zone.

The stage may be rotated to any degree and scanned in repeated increments such as, for example, every 20 degrees, until the entire target surface has been scanned. In the case of modifying the surface of contact lenses, the target surface is generally the optical zone which is about as wide as the raw beam generated by the excimer laser. Therefore, the scan of the entire target surface can be effected by rotating the stage 180 degrees and making one scan (or two CE scans).

As illustrated in FIG. 1b, if more material must be removed from the central region of a target to produce a final desired target surface, the beam scan according to the present invention, begins at a first edge and proceeds toward the center, or bisecting line of the target. When the scan reaches said bisecting line, the scan is interrupted, the beam is inactivated and then returned to the point at the edge where the scan originated. The stage to which the target is affixed is rotated 180 degrees. The beam is then reactivated and proceeds toward the bisecting line such that the entire target surface is scanned.

Alternatively, after the beam reaches a bisecting line after travelling from the first edge, the beam may then be inactivated and then may be directed to the opposing edge and then scanned toward said bisecting line until the entire target surface has been scanned. In this way, the target need not be rotated. This embodiment would be preferred if the target being scanned could not be conveniently or accurately rotated, such as a supine patient having corneal surgery.

Therefore, to achieve the improved ablation results in accordance with this invention, the beam may be scanned in a direction proceeding from "center-to-edge" or from "edge-to-center" depending only upon what final results are desired in view of the condition of the initial target surface. In other words, the amount of material to be removed at any given point from the target surface determines where the beam scan will begin and end.

It is therefore believed that to reduce debris accumulation on the target surface, the beam scan must begin at a point on the target surface where the least amount of material is to be removed and the least amount of debris will be formed. It will therefore, be understood by the skilled practitioner in the art, that the scans may begin and end in any variety of positions imaginable to create any finished surface effect desired, from any shaped original target surface.

It is understood that a bisecting line on the target surface is a line extending across the center of the target surface. (The target surface need not be circular or spherical in shape.)

The laser energy applied to a target per unit area is known as the fluence, which for UV radiation is often expressed in terms of millijoules per square centimeter (mJ/cm$^2$). The fluence range of the laser scanned in accordance with the present invention is preferably from about 20 to about 5000 mJ/cm$^2$, is more preferably from about 500 to about 2000 mJ/cm$^2$, and is most preferably from about 750 to about 1500 mJ/cm$^2$.

While the method of the present invention will work at any given energy level it is understood by those skilled in the field that certain materials will require a certain fluence to effectively affect surface characteristics through ablation.

A "crosslinked" polymeric material is understood to describe any polymeric material which has any attachment of two chains of its polymer molecules by bridges comprised of either an element, a group, or a compounds known as crosslinking agents.

The term "thermoset" material refers to a polymer which solidifies or "sets" irreversibly when heated. By contrast, a "thermoplastic" material is understood to refer to a polymer which softens when exposed to heat and is able to return to its original condition.

While the present invention is well suited for the modification of contact lenses, the modification of contact lens buttons, blanks and molds, as well as the tools used to make the molds and the contact lenses is also contemplated by the present invention. Indeed any means for imparting optical properties or surface geometries to another surface may be modified by the present invention. The surface modification through laser scanning of such tools used to make molds which, in turn, are used to make contact lenses in a cast molding procedure is disclosed in a concurrently filed and commonly assigned U.S. patent application Ser. No. 07/953,425, filed on Sep. 29, 1992.

The present invention is further thought to be useful for other laser scanning applications such as corneal sculpting as well as any other procedures where ablation debris has been noted as an obstacle to achieving better target surface quality after scanning.

Many other modifications and variations of the present invention are possible to the skilled practitioner in the field in light of the teachings herein. It is therefore understood that, within the scope of the claims, the present invention can be practiced other than as herein specifically described.

I claim:

1. A method for ablatively modifying a target surface while avoiding ablative debris accumulation comprising the steps of a) directing a beam of pulsed UV radiation at the point of the target surface where the least amount of material is to be removed; and b) scanning the beam in the direction toward the portion of the target surface where the greatest amount of material is to be removed.

2. The method of claim 1 wherein said beam of pulsed UV radiation is emitted from an excimer laser.

3. The method of claim 1 wherein said target surface is comprised of a crosslinked polymeric material.

4. The method of claim 1 wherein said target is a thermoset material.

5. The method of claim 1 wherein said target is a thermoplastic material.

6. The method of claim 1 wherein the fluence of said beam of UV radiation is from about 20 mJ/cm$^2$ to about 5000 mJ/cm$^2$.

7. The method of claim 1 wherein the fluence of said beam is about 1 J/cm$^2$.

8. The method of claim 1 wherein said target is a contact lens.

9. A method for ablatively modifying a target surface while avoiding ablative debris accumulation comprising the steps of a) directing a beam of pulsed UV radiation at the edge of the target surface; b) scanning said beam in a direction toward and stopping at a bisecting line of the target surface; c) rotating the target 180 degrees; d) returning the beam to the beam position of step a) which is now the opposing edge of the target surface; and e) scanning the beam in a direction toward and stopping at said bisecting line such that the entire target surface is scanned.

10. A method for ablatively modifying a target surface while avoiding ablative debris accumulation comprising the steps of a) directing a beam of pulsed UV radiation at a first edge of a target surface; b) scanning said beam in a direction toward and stopping at a bisecting line on said target surface; c) inactivating said beam; d) directing said beam at the edge directly opposing said first edge; e) reactivating said beam; f) scanning said beam in a direction from said opposing edge toward and stopping at said bisecting line such that the entire target surface has been scanned.

11. The method of claim 9 wherein said target is an element capable of imparting optical properties or surface geometries on another surface.

12. The method of claim 10 wherein said target is an element capable of imparting optical properties or surface geometries on another surface.

13. The method of claim 9 wherein said target is a contact lens.

14. The method of claim 10 wherein said target is a contact lens.

15. The method of claim 10 wherein said target is a corneal surface.

16. A method for claim 1 wherein said beam of pulsed UV radiation is provided directly to the point of the target surface where the least amount of material is to be removed, and said beam is scanned in the direction toward the portion of the target surface where the greatest amount of material is to be removed.

* * * * *